(12) United States Patent
Yamazaki

(10) Patent No.: US 6,675,652 B2
(45) Date of Patent: Jan. 13, 2004

(54) ANGULAR SENSOR AND METHOD OF MANUFACTURE THEREOF

(75) Inventor: Toshio Yamazaki, Fukui (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/959,794
(22) PCT Filed: Mar. 16, 2001
(86) PCT No.: PCT/JP01/02097
§ 371 (c)(1), (2), (4) Date: Feb. 12, 2002
(87) PCT Pub. No.: WO01/69175
PCT Pub. Date: Sep. 20, 2001

(65) Prior Publication Data
US 2002/0184947 A1 Dec. 12, 2002

(30) Foreign Application Priority Data
Mar. 17, 2000 (JP) .......................... 2000-076204

(51) Int. Cl.[7] .......................... G01P 15/09; G01P 15/097
(52) U.S. Cl. .............................. 73/504.16; 73/504.12; 310/345
(58) Field of Search .................... 73/504.16, 493, 73/504.12; 310/345, 351

(56) References Cited

U.S. PATENT DOCUMENTS 5,668,316 A * 9/1997 Iwai et al. .................... 73/493
5,699,235 A 12/1997 Tsurumiya et al.
6,182,508 B1 * 2/2001 Takeuchi et al. .............. 73/493

FOREIGN PATENT DOCUMENTS

| JP | 7-44566 | 11/1995 |
| JP | 8-271257 | 10/1996 |
| JP | 9-61203 | 3/1997 |
| JP | 9-203638 | 8/1997 |
| JP | 11-6736 | 1/1999 |
| JP | 11-248462 | 9/1999 |
| JP | 11-295074 | 10/1999 |
| JP | 2000-49437 | 2/2000 |

* cited by examiner

Primary Examiner—Hezron Williams
Assistant Examiner—John Hanley
(74) Attorney, Agent, or Firm—McDermott, Will & Emery

(57) ABSTRACT

An angular velocity of the present invention includes a resonator formed of a resonating member and a connecting member, a first base connected to the connecting member, a holding plate to hold the first base, a circuit board fixed onto the holding plate, an elastic body disposed on an end part of at least one selected from the holding plate and circuit board, a case housing the resonator, first base, holding plate, circuit board and elastic body and provided with an opening, and a second base put in place so as to close the opening of the case. The resonator has a short side and a long side. The resonator is located with the direction of the long side thereof arranged perpendicular to the second base, the elastic body is located between an end part of at least one selected from the holding plate and circuit board and the walls of the case, and at least one selected from the holding plate and circuit board is held by the case with an elastic pressure of the elastic body, thereby allowing the compression rate of the elastic body to be prevented from varying. As a result, an angular velocity sensor having stable output characteristics is realized.

19 Claims, 11 Drawing Sheets

E: Expansion

C: Contraction

E : Expansion
C : Contraction

2

ANGULAR SENSOR AND METHOD OF MANUFACTURE THEREOF

DESCRIPTION

1. Technical Field

The present invention relates to an angular velocity sensor.

2. Background Art

Angular velocity sensors have been traditionally used, for example, in controlling the attitude of such mobile units as aircraft, vehicles and the like and in navigation systems, and the like. Such conventional angular velocity sensors are described in the Japanese Patent Application Unexamined Publication No. H8-271257.

A description is given below to conventional angular velocity sensors with reference to drawings.

FIG. 11 is a side cross-sectional view of a conventional angular velocity sensor and FIG. 12 and FIG. 13 are a top cross-sectional view and a bottom view of the same, respectively.

In FIG. 11 to FIG. 13, a tuning fork (resonator) is fixed on a first base 1. The tuning fork comprises a first resonating member (not shown in drawings) and a second resonating member (not shown in drawings). First base 1 has three terminal insertion holes (not shown in drawings). Three terminals 2 are inserted in three respective terminal insertion holes (not shown in drawings). A driving electrode (not shown in drawings) or a detecting electrode (not shown in drawings) is disposed on first and second resonators. Three terminals 2 are electrically connected to the driving electrode or the detecting electrode. Cover 3 is put in place to cover the tuning fork fixed onto first base 1. First circuit board 4 holds securely terminal 2 protruding from first base 1 by soldering. Thus, first base 1 and cover 3 with the tuning fork housed inside thereof are put together. Second circuit board 5 is disposed almost in parallel to first circuit board 4. Electronic device 6 for processing an output signal produced at the detecting electrode of the tuning fork in accordance with an angular velocity is mounted on the surface of second circuit board 5. On second circuit board 5 are disposed a power supply electrode (not shown in drawings), a GND electrode (not shown in drawings) and an output electrode (not shown in drawings). These electrodes are electrically connected to respective three terminals 2 mounted on first base 1 via first circuit board 4 and conductor 7. A pair of rubber pieces 8 hold the side surfaces of circuit board 4. First base 1, cover 3, first circuit board 4, second circuit board 5 and a pair of rubber pieces 8 are housed inside of bottomed cylindrical case 9. A pair of holding members 11 protrude upward from respective both end parts of resin made second base 10 to hold the pair of rubber pieces 8. An opening of case 9 is closed by second base 10. On second base 10 are disposed three external terminals 12, which protrude downward therefrom. These external terminals 12 are electrically connected to the power supply electrode (not shown in drawings), GND electrode (not shown in drawings) and output electrode (not shown in drawings) that are disposed on second circuit board 5, respectively.

Next, a description is given to how the conventional angular velocity sensor structured as above performs.

An alternating voltage is applied to the driving electrode of the tuning fork (resonator), thereby causing the tuning fork to vibrate by bending in the driving direction at a velocity of V with a natural frequency of vibration in the driving direction. When the tuning fork rotates at an angular velocity of ω around the center axis thereof under this state, a Coriolis force of F=2 mV·ωis generated on the first resonating member and second resonating member of the tuning fork, respectively, thereby allowing the electric charges produced on the detecting electrode to be fed to electronic device 6 mounted on second circuit board 5 via first circuit board 4 and conductor 7. An output voltage amplified in electronic device 6 is supplied as an output to an external computer and the like via external terminal 12. Thus, an angular velocity is allowed to be detected.

According to the conventional set-up as described in above, however, a pair of rubber pieces 8 are held by a pair of holding members 11 disposed on second base 10 and first circuit board 4 is fixed so as to have rubber piece 8 compressed by holding member 11. Since holding member 11 produced by resin molding has inherently a wide range of variation in dimensions, rubber piece 8 presents a variation in compressibility, resulting in changes of vibration applied from outside to the tuning fork, which is housed inside cover 3, via rubber piece 8 and first circuit board 4. Therefore, the output characteristics of the angular velocity sensor end up with being made unstable.

The present invention is to provide an angular velocity sensor with stabilized output characteristics realized by preventing a variation in compressibility of rubber pieces.

SUMMARY OF THE INVENTION

An angular velocity sensor of the present invention comprises:

(a) a resonator including a resonating member and a connecting member;

(b) a first base connected to the connecting member;

(c) a holding plate to hold the first base;

(d) a circuit board fixed onto the holding plate;

(e) an elastic body disposed on an end part of at least one selected from the holding plate and circuit board; and (f) a case having an opening and accommodating the resonator, first base, holding plate, circuit board and elastic body, wherein the elastic body is located between the inner walls of the case and an end part of at least one selected from the holding plate and circuit board; and at least one selected from the holding plate and circuit board is held by the case with elastic pressure of the elastic body.

Preferably, the angular velocity sensor further comprises:

(g) a second base put in place so as to close the opening of the case, wherein the resonator has a short side and a long side; and the resonator is located on the second base so as to have the long side thereof directed perpendicular to the surface of the second base.

A manufacturing method of angular velocity sensors of the present invention comprises the steps of:

(a) producing a resonator that includes a resonating member and a connecting member;

(b) producing a first base;

(c) producing a holding plate;

(d) producing a circuit board;

(e) producing an elastic body;

(f) producing a case;

(g) connecting the connecting member of the resonator to the first base;

(h) having the circuit board held on the first base;

(i) fixing the first base onto the holding plate (j) putting together the resonator, holding plate, circuit board and elastic body in such a way that an end part of at least one selected from the holding plate and circuit board is held by the elastic body; and (k) disposing the assembly formed of the resonator, first base, holding plate, circuit board and elastic body in the case so as to have the resonator and circuit board situated inside of the case via the elastic body.

Preferably, the manufacturing method further comprises the step of (l) producing a second base, wherein the resonator has a short side and a long side, the step (j) has a step of putting together the resonator, first base, holding plate, circuit board, second base and elastic body so as to have an end part of at least one selected from the holding plate and circuit board held by the elastic body, and the step (k) has a step of pressing into the case the assembly formed of the resonator, first base, holding plate, circuit board, second base and elastic body so as to have the long side of the resonator directed perpendicular to the second base and another step of having the opening of the case closed with the second base so as to have at least one selected from the holding plate and circuit board held by the case.

Preferably, the step of producing the resonator has a step of producing a resonator that includes a first resonating member, a second resonating member, a driving electrode and a detecting electrode, wherein respective end parts of the first resonating member and second resonating member are connected to the connecting member, and the driving electrode and detecting electrode are disposed on at least one selected from the first resonating member and second resonating member.

Accordingly, a variation in compression rate of an elastic body is prevented, thereby making an angular velocity sensor with stable output characteristics available.

BEST MODE FOR CARRYING OUT THE INVENTION

Figure 1:
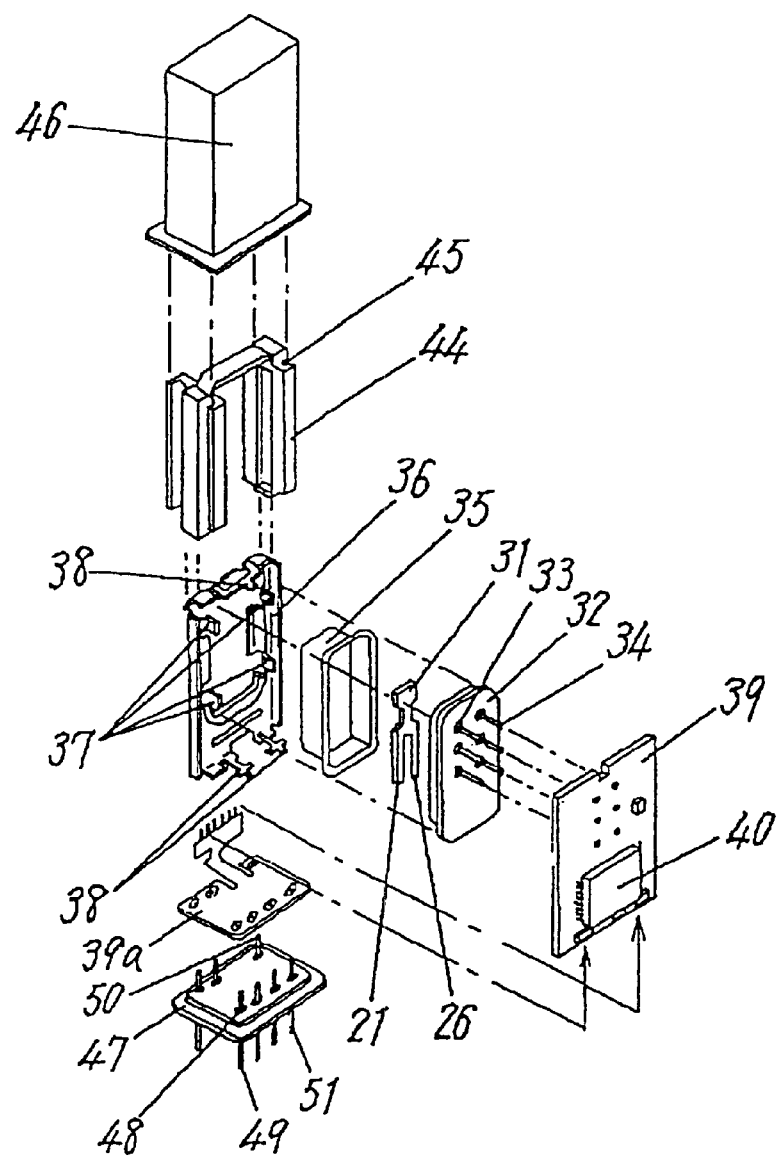
FIG. 1 is an exploded perspective view of an angular velocity sensor in an exemplary embodiment of the present invention.

An angular velocity sensor of the present invention comprises:

(a) a resonator including a resonating member and a connecting member;

(b) a first base connected to the connecting member;

(c) a holding plate to hold the first base;

(d) a circuit board fixed onto the holding plate;

(e) an elastic body disposed on an end part of at least one selected from the holding plate and circuit board; and (f) a case having an opening and housing the resonator, first base, holding plate, circuit board and elastic body, wherein the elastic body is located between the inner walls of the case and an end part of at least one selected from the holding plate and circuit board, and at least one selected from the holding plate and circuit board is held by the case with elastic pressure of the elastic body.

Accordingly, a variation in compression rate of an elastic body is prevented, thereby allowing an angular velocity sensor with stable output characteristics to be realized.

Preferably, the angular velocity sensor further comprises:

(g) a second base put in place so as to close the opening of the case, wherein the resonator has a short side and a long side, and the resonator is disposed on the second base so as to have the long side thereof directed perpendicular to the surface of the second base.

A manufacturing method of angular velocity sensors of the present invention comprises the steps of:

(a) producing a resonator that includes a resonating member and a connecting member;

(b) producing a first base;

(c) producing a holding plate;

(d) producing a circuit board;

(e) producing an elastic body;

(f) producing a case;

(g) connecting the connecting member of the resonator to the first base;

(h) having the circuit board held on the first base;

(i) fixing the first base onto the holding plate;

(j) putting together the resonator, holding plate, circuit board and elastic body in such a way that an end part of at least one selected from the holding plate and circuit board is held by the elastic body; and (k) disposing the assembly formed of the resonator, first base, holding plate, circuit board and elastic body in the case so as to have the resonator and circuit board situated inside of the case via the elastic body.

Accordingly, a variation in compression rate of an elastic body is prevented, thereby allowing an angular velocity sensor with stable output characteristics to be realized.

Preferably, the manufacturing method further comprises the step of (l) producing a second base, wherein the resonator has a short side and a long side, the step (j) has a step of putting together the resonator, first base, holding plate, circuit board, second base and elastic body so as to have an end part of at least one selected from the holding plate and circuit board held by the elastic body, and the step (k) has a step of pressing into the case the assembly formed of the resonator, first base, holding plate, circuit board, second base and elastic body so as to have the long side of the resonator directed perpendicular to the second base and another step of having the opening of the case closed with the second base so as to have at least one selected from the holding plate and circuit board held by the case.

Preferably, the step of producing the resonator has a step of producing a resonator that includes a first resonating member, a second resonating member, a driving electrode and a detecting electrode, wherein respective end parts of the first resonating member and second resonating member are connected to the connecting member, and the driving electrode and detecting electrode are disposed on at least one selected from the first resonating member and second resonating member.

Preferably, the resonator comprises a first resonating member, second resonating member, driving electrode and detecting electrode, wherein respective end parts of the first resonating member and second resonating member are connected to the connecting member, and the driving electrode and detecting electrode are disposed on at least one selected from the first resonating member and second resonating member.

Preferably, the driving electrode and detecting electrode have an output terminal, respectively, the first base has a plurality of terminal insertion holes and the respective output terminals pass through the plurality of terminal insertion holes.

Preferably, the circuit board has an electronic device, power supply electrode, GND electrode and output electrode, and the electronic device processes an output signal produced at the detecting electrode according to an angular velocity.

Preferably, the case has a bottomed tubular shape.

Preferably, the elastic body is formed of rubber.

Preferably, each respective angular velocity sensor in above further comprises:

(h) a cover fixed on the first base and enclosing the resonator.

An angular velocity sensor in an exemplary embodiment of the present invention comprises:

(a) a resonator having:

a first resonating member with at least one selected from a driving electrode and a detecting electrode disposed thereon;

a second resonating member with at least one selected from a driving electrode and a detecting electrode disposed thereon; and a connecting member to connect between an end part of the first resonating member and an end part of the second resonating member;

(b) a first base having at least three terminal insertion holes formed thereon, wherein the first base has the connecting member fixed thereon, and at least three terminals electrically connected to the driving electrode or detecting electrode pass through the terminal insertion holes;

(c) a cover attached securely to the first base to cover the resonator;

(d) a holding plate to hold at least one selected from the base and cover;

(e) a circuit board fixed onto the holding plate, wherein the circuit board is provided with an electronic device, a power supply electrode, a GND electrode and an output electrode, and the electronic device processes an output signal produced at the detecting electrode according to an angular velocity;

(f) a rubber piece disposed on the side of the holding plate;

(g) a bottomed cylindrical case housing the first base, cover, holding plate, circuit board and rubber piece; and (h) a second base with through holes formed thereon to close an opening of the case, wherein a power supply terminal, a GND terminal and an output terminal electrically connected to the power supply electrode, GND electrode and output electrode disposed on the circuit board, respectively, pass through the through holes, the first resonating member and second resonating member are arranged in such as way as the direction of the length thereof is made perpendicular to the second base;

the rubber piece is affixed to the side surface of at least one selected from the holding plate and circuit board; and the rubber piece, first resonating member and second resonating member are pressed into the case while the foregoing posture thereof being maintained.

Accordingly, a variation in compression rate of the rubber piece is prevented from occurring, thereby allowing an angular velocity sensor with stable output characteristics to be realized. More specifically, a variation in compression rate of the rubber piece sandwiched between the circuit board or holding plate and the inner side walls of the case is allowed to be prevented from occurring. As a result, a variation in vibration imposed to the tuning fork structure from outside is prevented from occurring, thereby allowing the output characteristics of the angular velocity sensor to be stabilized.

Preferably, the foregoing holding plate has at least two holding protrusions and those holding protrusions are fixed onto the circuit board, thereby allowing the circuit board to be held securely by the holding plate. As a result, the circuit board is no longer needed to be held by the terminals of the first base. Therefore, a mechanical stress is prevented from appearing at the place where a terminal is soldered, thereby allowing a phenomenon of unstable conduction of electricity to be prevented from occurring. As a result, the output characteristics of the angular velocity sensor involved are stabilized.

Preferably, the rubber piece has a small cross-sectional area part to reduce a compressive force applied perpendicular to the direction of the length of the resonator. Accordingly, the spring constant of the rubber piece in the direction perpendicular to the small cross-sectional area part becomes small. Therefore, the natural resonant frequency of the rubber piece in the direction perpendicular to the small cross-sectional area part becomes small, thereby allowing the small cross-sectional area part to attenuate a particularly high frequency vibration that is applied from outside to the tuning fork of an angular velocity sensor. As a result, it becomes hard for the particularly high frequency vibration to be applied to the first and second resonating members.

Preferably, the center of gravity of an assembly formed of the first resonating member, second resonating member, connecting member, first base, cover, holding plate and circuit board almost coincides with the center of gravity of the rubber piece. Accordingly, when only an acceleration is applied to an angular velocity sensor without any additional angular velocity applied thereto, the resonator, first base, cover, holding plate and circuit board are prevented from rotating because of the acceleration applied, thereby allowing an erroneous output signal corresponding to an angular velocity virtually produced by the foregoing rotation to be prevented from being generated and allowing only a true angular velocity to be detected. As a result, an angular velocity acting on the angular velocity sensor is accurately detected.

Preferably, the holding plate has at least two holding members and these holding members are swaged on the first base, thereby allowing the first base fixed onto the holding plate. Thus, the first base is allowed to be fixed onto the holding plate by the use of a small number of parts.

Next, a description is given to an angular velocity sensor in an exemplary embodiment of the present invention with reference to drawings.

Figure 2:
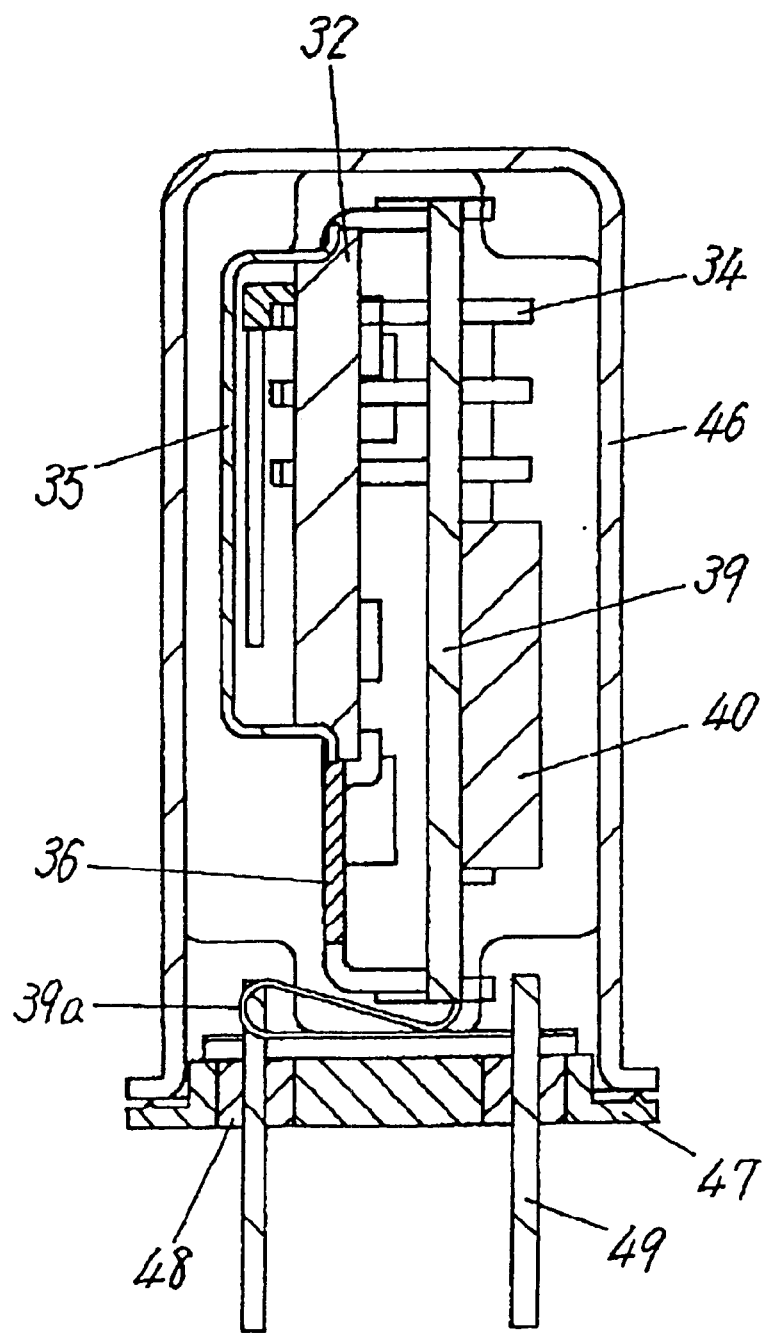
FIG. 2 is a side cross-sectional view of the angular velocity sensor of FIG. 1.
Figure 3:
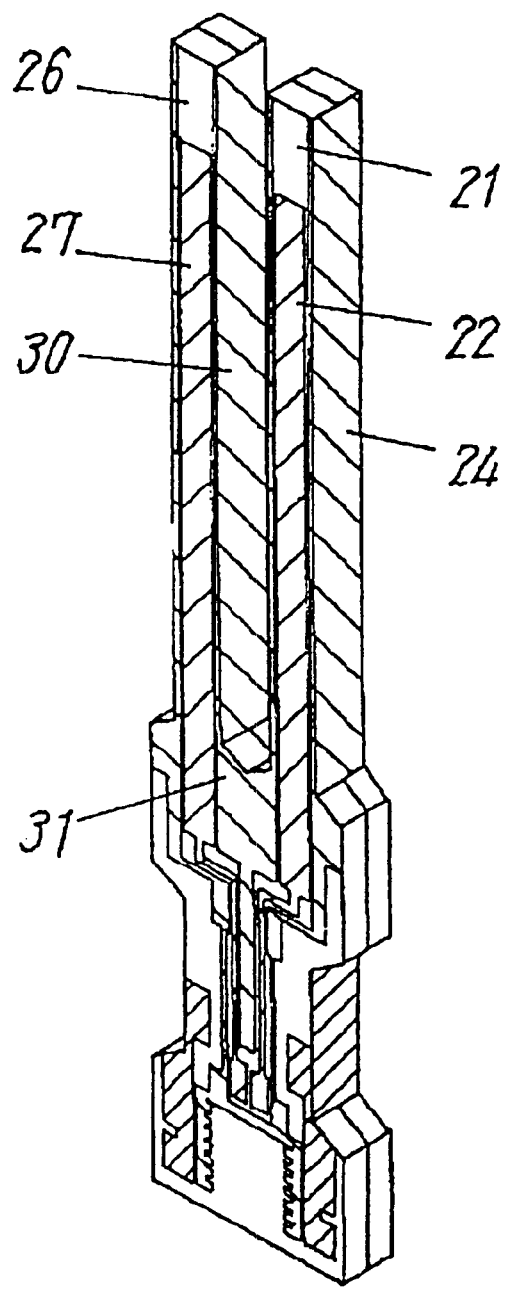
FIG. 3 is a perspective view of a first resonating member, a second resonating member and a connecting member of the angular velocity sensor of FIG. 1.
Figure 4:
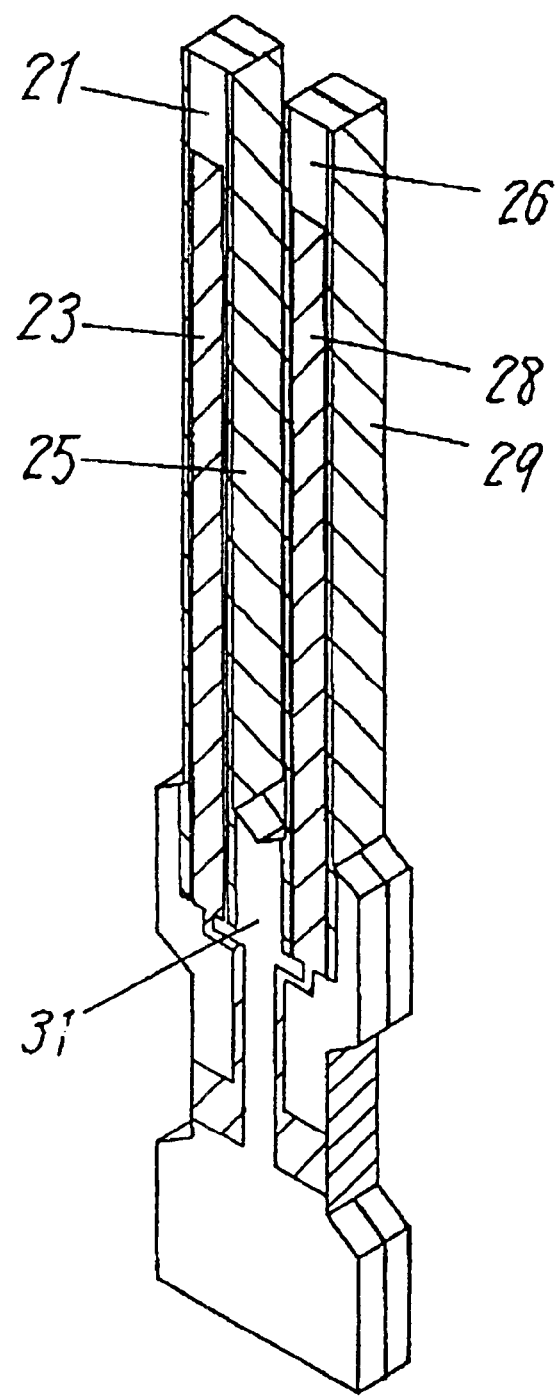
FIG. 4 is a perspective view of the first resonating member, second resonating member and connecting member of the angular velocity sensor of FIG. 1 looked from the back side.
Figure 5:
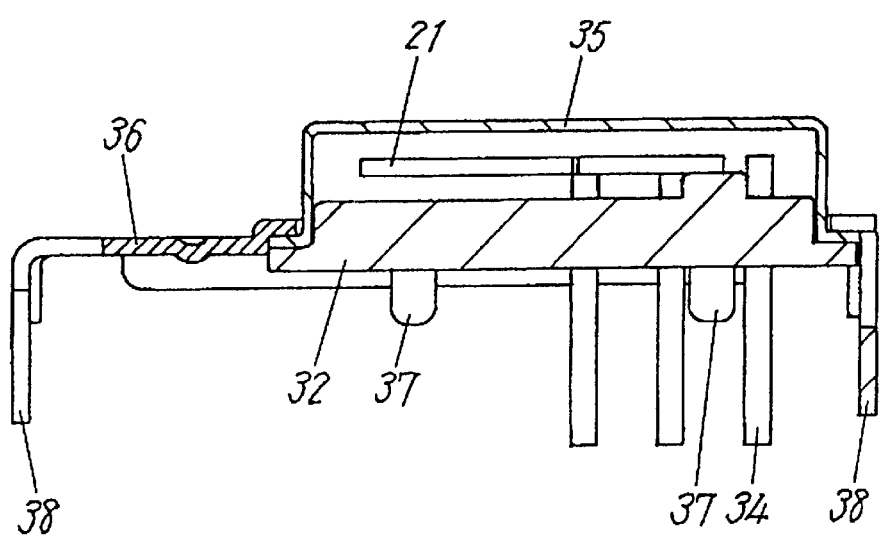
FIG. 5. is a side cross-sectional view to show how a first base is fixed onto a holding plate in the angular velocity sensor of FIG. 1.
Figure 6:
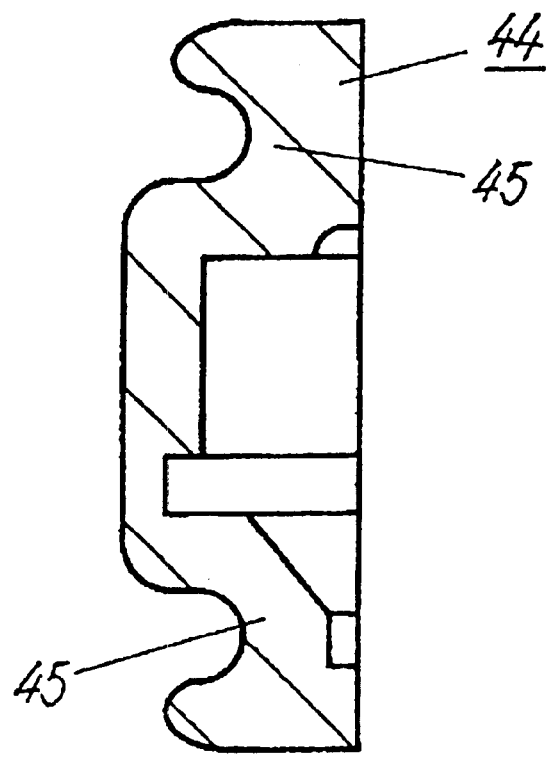
FIG. 6 is a side cross-sectional view of a rubber piece in the angular velocity sensor of FIG. 1.
Figure 7:
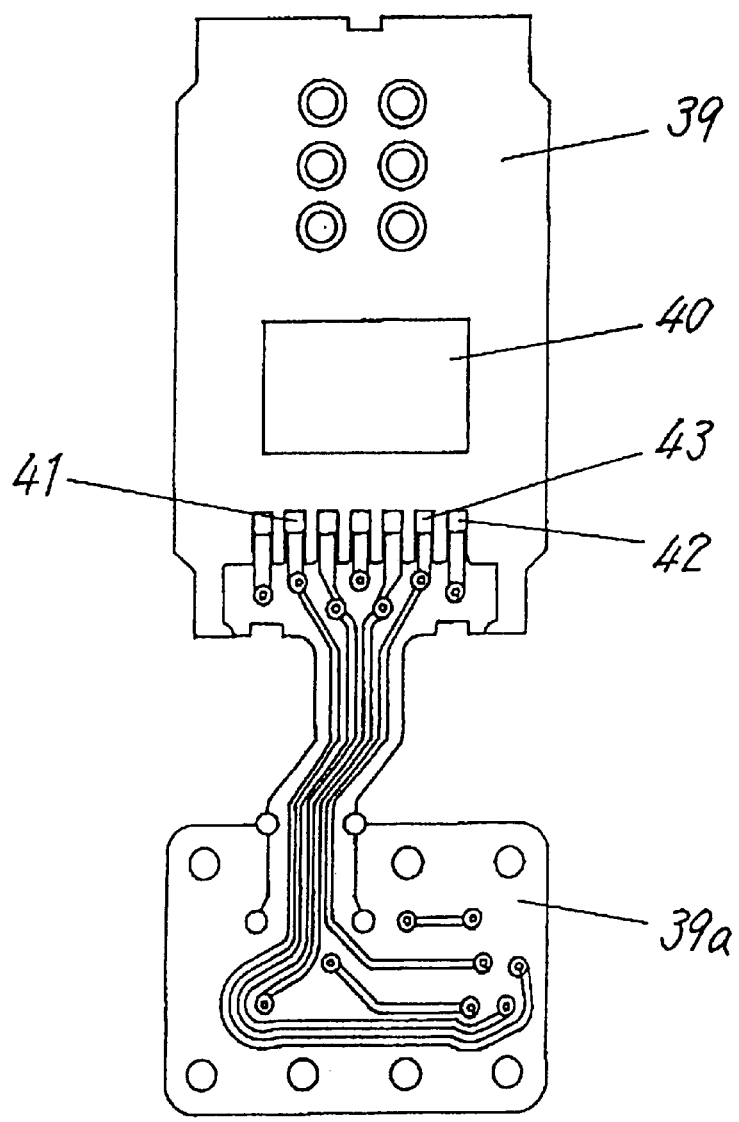
FIG. 7 is a top view of a base board connected with a flexible wiring board in the angular velocity sensor of FIG. 1.

FIG. 1 is an exploded perspective view of an angular velocity sensor in an exemplary embodiment of the present invention. FIG. 2 is a side cross-sectional view of the angular velocity sensor of FIG. 1. FIG. 3 is a perspective view of a first resonating member, a second resonating member and a connecting member of the angular velocity sensor of FIG. 1. FIG. 4 is a perspective view of the first resonating member, second resonating member and connecting member of the angular velocity sensor of FIG. 1 when looked from the back side. FIG. 5. is a side cross-sectional view to show how a first base is fixed on a holding plate in the angular velocity sensor of FIG. 1. FIG. 6 is a side cross-sectional view of an elastic body in the angular velocity sensor of FIG. 1. FIG. 7 is a top view of a base board connected with a flexible wiring board in the angular velocity sensor of FIG. 1.

In FIG. 1 to FIG. 7, first resonating member 21 is formed by laminating a plurality of thin plates made of quartz. The plurality of quartz plates are of a single crystal, respectively, each of which has a crystal axis different from one another. As FIG. 3 shows, first driving electrode 22 is disposed on the upper surface of first resonating member 21. As FIG. 4 shows, second driving electrode 23 is disposed on the bottom surface of first resonating member 21. On the outside surface of first resonating member 21 is disposed first detecting electrode 24 made of gold. Further, on the inside surface of first resonating member 21 is disposed second detecting electrode 25 made of gold.

Second resonating member 26 is formed by laminating a plurality of thin plates made of quartz. The plurality of quartz plates are of a single crystal, respectively, each of which has a crystal axis different from one another. On the upper surface of second resonating member 26 is disposed monitoring electrode 27 made of gold, on the bottom surface of second resonating member 26 is disposed third driving electrode 28, on the outside surface of second resonating member 26 is disposed third detecting electrode 29 and, further, on the inside surface of second resonating member 26 is disposed fourth detecting electrode 30.

One end of each respective first resonating member 21 and second resonating member 26 is connected with each other via connecting member 31. First base 32 is made of a metal, has connecting member 31 fixed thereon and has six terminal insertion holes 33 formed thereon. Terminal insertion holes 33 have six terminals 34 passing through, respective terminals 34 being electrically connected to first driving electrode 22, second driving electrode 23, third driving electrode 28, first detecting electrode 24, second detecting electrode 25 and third detecting electrode 29. Cover 35 is made of a metal and fixed on the periphery of first base 32. Inside of the space formed of first base 32 and cover 35 are housed first resonating member 21, second resonating member 26 and connecting member 31. In addition, the tuning fork comprises first resonating member 21, second resonating member 26 and connecting member 31.

As FIG. 5 shows, holding plate 36 is made of a metal and holding member 37 to hold first base 32 is formed on the side surface of holding plate 36. Holding member 37 is swaged on first base 32 to fix first base 32 onto holding plate 36. Accordingly, in the present exemplary embodiment, two each of four holding members 37 are provided on both side surfaces of holding plate 36, respectively. By having these holding members 37 swaged on first base 32, first base 32 is mounted on holding plate 36, thereby allowing first base 32 to be mounted on holding plate 36 by the use of a small number of parts. In addition, there is provided a total of three holding protrusions 38 on both end parts located in the direction of the length of holding plate 36. Circuit board 39 is put in place almost in parallel with holding plate 36. Circuit board 39 is fixed onto holding plate 36 by joining holding protrusions 38 of holding plate 36 and circuit board 39 together by soldering. Thus, since three holding protrusions 38 are formed on holding plate 36 and these holding protrusions 38 are fixed onto circuit board 39 to have circuit board 39 held by holding plate 36, circuit board 39 is no longer needed to be held by terminals 34 disposed on first base 32. Therefore, a stress is prevented from being produced at the place where terminal 34 is soldered, thereby preventing the electrical conduction through terminal 34 from becoming unstable. As a result, output characteristics of the angular velocity sensor are made stable. On the surface of circuit board 39 is mounted electronic device 40, which processes output signals fed from first detecting electrode 24, second detecting electrode 25, third detecting electrode 29 and fourth detecting electrode 30. Further, as FIG. 7 shows, power supply electrode 41, GND electrode 42 and output electrode 43 are disposed on the surface of circuit board 39.

Rubber piece 44 acting as an elastic body is a molded body formed of rubber. Rubber piece 44 is shaped almost like a sharp cornered U letter in the cross-section thereof. Both side surfaces of holding plate 36 are held by such rubber pieces 44. As FIG. 6 shows, rubber piece 44 has small cross-sectional area part 45. Due to the existence of small cross-sectional area part 45, the compressive force of rubber piece 44 is reduced. In addition, the center of gravity of rubber piece 44 almost coincides with the center of gravity of a system formed by putting together first resonating member 21, second resonating member 26, connecting member 31, first base 32, cover 35, holding plate 36 and circuit board 39. Case 46 is shaped like a bottomed cylinder and made of a metal. Inside case 46 are housed first base 32, cover 35, holding plate 36, circuit board 39 and rubber piece 44. Rubber piece 44 is sandwiched and compressed between the inner side walls of case 46 and the side surface of holding plate 36. Second base 47 has seven through holes 48 and closes the opening of case 46. Power supply terminal 49, GND terminal 50 and output terminal 51 pass through these through holes 48. These terminals 49, 50 and 51 are electrically connected to power supply electrode 41, GND electrode 42 and output electrode 43 of circuit board 39, respectively, via flexible wiring board 39a.

Next, a description is given to how the angular velocity sensor of the present exemplary embodiment structured as in above is assembled.

First, two kinds of thin plate, each formed of a single quartz crystal and having a crystal axis that is different from the other, are prepared. These two thin plates are bonded together. Thus, a resonator formed of first resonating member 21, second resonating member 26 and connecting member 31 is produced. This resonator has the function of acting as a tuning fork.

Then, first driving electrode 22 is evaporated on the front surface of first resonating member 21, second driving electrode 23 is evaporated on the back surface thereof, first detecting electrode 24 is evaporated on the outer side surface thereof and second detecting electrode 25 is evaporated on the inner side surface thereof. All above vapor deposition processes are performed by evaporation of gold. Further, monitoring electrode 27 is evaporated on the front surface of second resonating member 26, third driving electrode 28 is evaporated on the back surface thereof, fourth detecting electrode 30 is evaporated on the inner side surface thereof and third detecting electrode 29 is evaporated on the outer side surface thereof. All above vapor deposition processes are performed by evaporation of gold.

Thereafter, six terminals 34 are made to pass through six terminal insertion holes 33 formed on first base 32. Then, an insulating material (not shown in drawings) formed of glass is filled in each respective insertion hole 33 to have six terminals 34 securely fixed on first base 32.

Then, connecting member 31 is fixed onto the upper surface of fist base 32. Thereafter, terminals 34 on first base 32 are connected to first driving electrode 22, second driving electrode 23, first detecting electrode 24, second detecting electrode 25, monitoring electrode 27, third driving electrode 28, third detecting electrode 29 and fourth detecting electrode 30 via lead wires made of gold (not shown in drawings) by wire bonding.

Cover 35 is fixed on the periphery of first base 32 in a vacuum, thereby allowing the inside of cover 35 to be maintained under vacuum.

By swaging holding members 37 of holding plate 36 on first base 32, holding plate 36 is fixed onto first base 32.

Then, electronic device 40 is mounted on circuit board 39. Thereafter, circuit board 39 is fixed onto holding plate 36 by soldering holding protrusions 38 of holding plate 36.

Electrical connections are completed by soldering terminals 34 of first base 32 to electrodes (not shown in drawings) disposed on circuit board 39.

Small cross-sectional area part 45 is formed in rubber piece 44 shaped almost like a sharp cornered U letter. Then, circuit board 39 and holding plate 36 are held by rubber piece 44 shaped almost like a sharp cornered U letter.

Power supply terminal 49, GND terminal 50 and output terminal 51 are made to pass through holes 48 on second base 47. Thereafter, an insulating material (not shown in drawings) formed of glass is filled in through holes 48, thereby fixing power supply terminal 49, GND terminal 50 and output terminal 51 onto second base 47.

Then, power supply electrode 41, GND electrode 42 and output electrode 43 on circuit board 39 are electrically connected to power supply terminal 49, GND terminal 50 and output terminal 51 on second base 47, respectively, by means of flexible circuit board 39a.

Inside of case 46, almost sharp cornered U letter like rubber piece 44 is compressed with small cross-sectional area part 45 thereof pinched by the use of a bar shaped tool (not shown in drawings). Then, circuit board 39, holding plate 36 and rubber piece 44 are housed inside case 46. At this time, the bar shaped tool (not shown in drawings) is stuck in small cross-sectional area part 45 that is provided on rubber piece 44, thereby holding rubber piece 44 while rubber piece 44 being kept in a compressed state and pushing rubber piece 44 into the inside of case 46. Thereafter, the bar shaped tool (not shown in drawings) is pulled out of small cross-sectional area part 45. Accordingly, circuit board 39 and holding plate 36 both held by rubber piece 44 are allowed to be housed readily inside case 46.

Finally, the opening of case 46 is closed by second base 47.

Next, a description is given to how the angular velocity sensor of the present exemplary embodiment assembled as described in above performs with reference to drawings.

Figure 8:
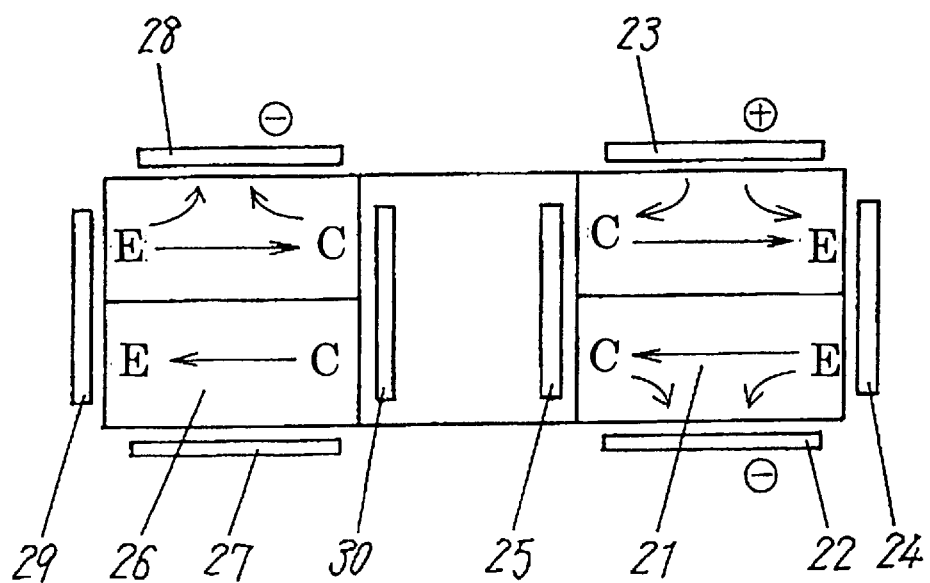
FIG. 8 is a schematic diagram to show how an angular velocity sensor in an exemplary embodiment of the present invention performs.

An AC voltage is applied to first driving electrode 22, second driving electrode 23 and third driving electrode 28 of the tuning fork (or the resonator). At this time, when a plus voltage is applied to second driving electrode 23 of first resonating member 21 and also a minus voltage is applied to first driving electrode 22 thereof the direction of crystal axis of the quartz thin plate becomes the same as the direction of electric charges at the side of first detecting electrode 24 as FIG. 8 shows. Therefore, first resonating member 21 expands at the side of first detecting electrode 24. However, at this time, the direction of crystal axis becomes opposite to the direction of electric charges at the side of second detecting electrode 25. Therefore, first resonating member 21 contracts at the side of second detecting electrode 25. As a result, first resonating member 21 slants towards the side of second resonating member 26.

Figure 9:
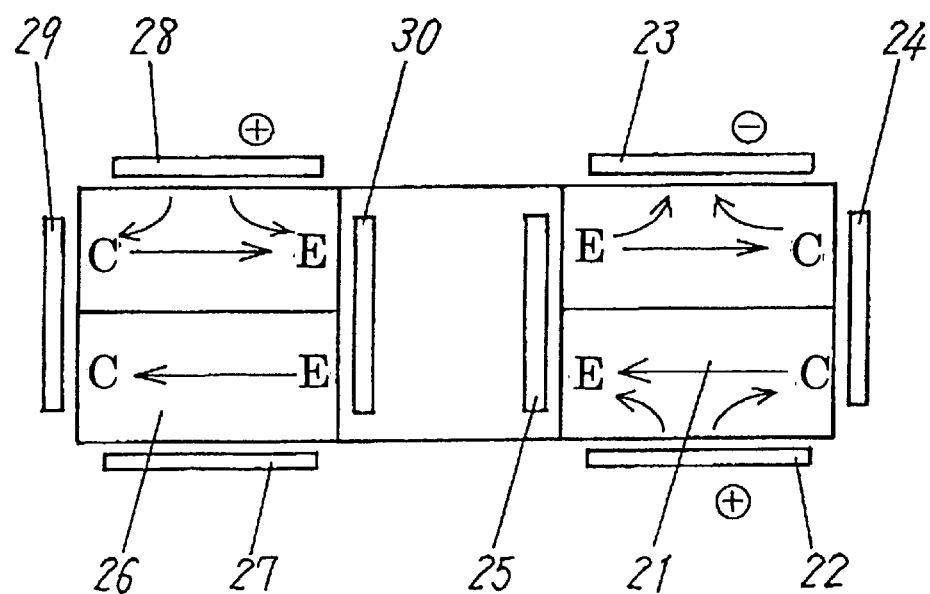
FIG. 9 is another schematic diagram to show how an angular velocity sensor in an exemplary embodiment of the present invention performs.

Next, when a minus voltage is applied to second driving electrode 23 of first resonating member 21 and also a plus voltage is applied to first driving electrode 22 thereof, the direction of crystal axis of the quartz thin plate becomes opposite to the direction of electric charges at the side of first detecting electrode 24 as FIG. 9 shows. Therefore, first resonating member 21 contracts at the side of first detecting electrode 24. However, at this time, the direction of crystal axis becomes the same as the direction of electric charges at the side of second detecting electrode 25. Therefore, first resonating member 21 expands at the side of second detecting electrode 25. As a result, first resonating member 21 slants towards the outside.

At the time when an AC voltage is applied to third driving electrode 28 of second resonating member 26, first resonating member 21 and second resonating member 26 present a bending vibration in the direction of the length of connecting member 31 at a velocity V with a natural vibration frequency in the driving direction since first resonating member 21 and second resonating member 26 are mechanically connected with each other via connecting member 31. When the tuning fork rotates around the center axis extending in the direction of the length of the tuning fork at an angular velocity ω under the state where first resonating member 21 and second resonating member 26 are presenting a bending vibration, a Coriolis force F=(mV)×(ω) is produced on first resonating member 21 and second resonating member 26. An output signal formed of electric charges produced on first detecting electrode 24, second detecting electrode 25, third detecting electrode 29 and fourth detecting electrode 30 in accordance with the Coriolis force is transferred via lead wires made of gold (not shown in drawings) and terminals 34 to electronic device 40 on circuit board 39, where the output signal is converted to an output voltage. Further, the output voltage is fed to a computer (not shown in drawings) on the other end of the angular velocity sensing system, where an angular velocity is detected.

Here, the case where unwanted vibrations are imposed from outside on an angular velocity sensor is examined. With the angular velocity sensor of the present exemplary embodiment, first resonating member 21 and second resonating member 26 are disposed on second base 47 in such a way as the direction of the length thereof is made perpendicular to second base 47, and rubber piece 44 is attached to the side surface of at least one selected from holding plate 36 and circuit board 39. Then, the resonator (tuning fork) formed of first resonating member 21 and second resonating member 26, rubber piece 44 and second base 47 are pressed into the inside of case 46, thereby preventing the compression rate of rubber piece 44 sandwiched between circuit board 39 or holding plate 36 and the inner side surface of case 46 from varying. As a result, the output characteristics of the angular velocity sensor are stabilized.

Next, the case where a vibration of an extremely high frequency is imposed from outside on an angular velocity sensor is examined. With the angular velocity sensor of the present exemplary embodiment, rubber piece 44 has small cross-sectional area part 45, which contributes to a reduction of compressive force in the direction perpendicular to the direction of the length of an assembly formed of first resonating member 21, second resonating member 26 and connecting member 31.

Here, a spring constant K of rubber piece 44 is expressed by mathematical model 1 as follows:

Mathematical Model 1: $K=E(A/h)$, where K is a spring constant of rubber piece 44 in the direction perpendicular to small cross-sectional area part 45, E is a longitudinal elastic coefficient of rubber piece 44, A is a cross-sectional area of small cross-sectional area part 45, and h is a width of rubber piece 44.

In this situation, the existence of small cross-sectional area part 45 leads to a reduction of the spring constant K of rubber piece 44 in the direction perpendicular to small cross-sectional area part 45. Further, a specific vibration frequency f of a mass formed by combining the tuning fork (resonator) formed of first resonating member 21, second resonating member 26 and connecting member 31, first base 32, cover 35, circuit board 39, holding plate 36 and a pair of rubber pieces 44 in the direction perpendicular to small cross-sectional area part 45 is expressed by mathematical model 2 as follows:

Mathematical Model 2: $f=(1/2\pi)\times(K/m)^{1/2}$, where f is a specific vibration frequency of a mass formed by combining the resonator (tuning fork) formed of first base 32, cover 35, circuit board 39, holding plate 36 and rubber piece 44 in the direction perpendicular to small cross-sectional area part 45, K is a spring constant of rubber piece 44 in the direction perpendicular to small cross-sectional area part 45, and m is a mass formed by combining the tuning fork (resonator), first base 32, cover 35, circuit board 39, holding plate 36 and rubber piece 44.

Figure 10:
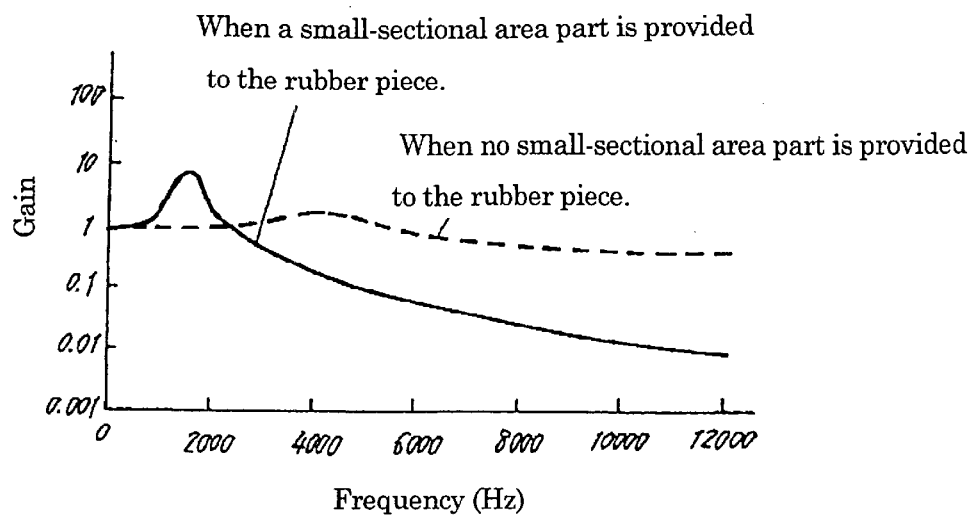
FIG. 10 is a diagram to show how a vibration entering into an angular velocity sensor in an exemplary embodiment of the present invention is attenuated by the use of a rubber piece.
Figure 11:
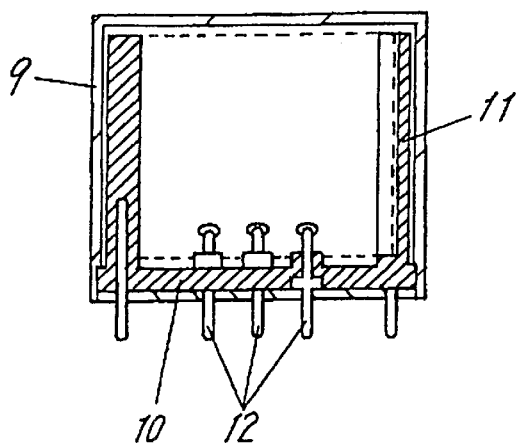
FIG. 11 is a side cross-sectional view of a conventional angular velocity sensor.
Figure 12:
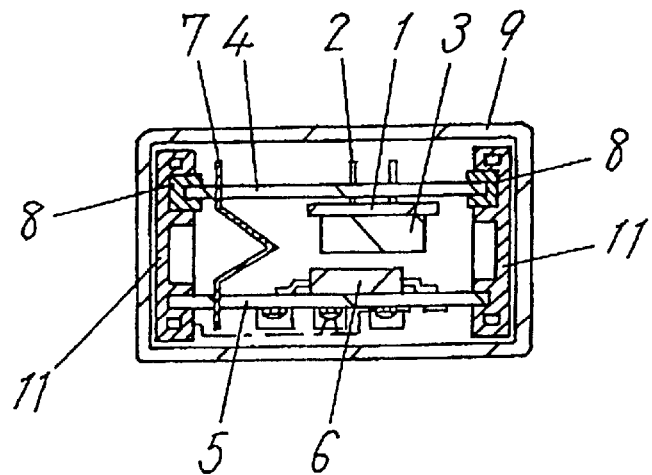
FIG. 12 is a cross-sectional view looked from the top of the conventional angular velocity sensor of FIG. 11.
Figure 13:
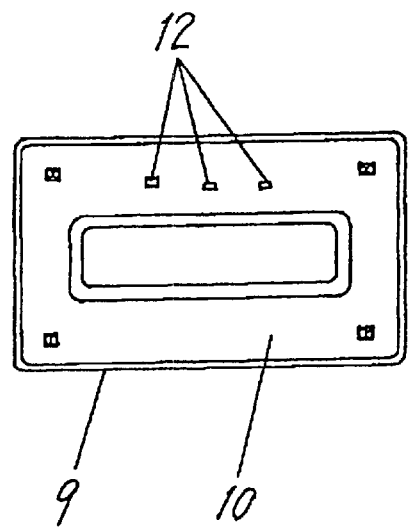
FIG. 13 is a bottom view of the conventional angular velocity sensor of FIG. 11.

Accordingly, the specific vibration frequency f of rubber piece 44 in the direction perpendicular to small cross-sectional area part 45 is decreased, thereby allowing small cross-sectional area part 45 to attenuate the particularly high frequency vibrations applied from outside to the tuning fork of the angular velocity sensor. Therefore, as FIG. 10 shows, when rubber piece 44 has small cross-sectional area part 45, it is made hard for the particularly high frequency vibrations to be transferred to first resonating member 21 and second resonating member 26 in comparison with the case where rubber piece 44 does not have small cross-sectional area part 45. As a result, the output characteristics of the angular velocity sensor are stabilized.

Further, the case where an acceleration is imposed on an angular velocity sensor is examined. With the angular velocity sensor of the present exemplary embodiment, the center of gravity of an assembly formed of first resonating member 21, second resonating member 26, connecting member 31, first base 32, cover 35, holding plate 36 and circuit board 39 almost coincides with the center of gravity of rubber piece 44. Therefore, when only an acceleration is applied to the angular velocity sensor without any angular velocity imposed thereto, first resonating member 21, second resonating member 26, connecting member 31, first base 32, cover 35, holding plate 36 and circuit board 39 located inside of rubber piece 44 are prevented from rotating, thereby allowing a false output signal, as if an angular velocity is generated, to be prevented from being produced and allowing only a true angular velocity imposed to the angular velocity sensor to be sensed. As a result, an angular velocity acting upon the angular velocity sensor is accurately detected.

In the present exemplary embodiment, although rubber is used as the elastic body, the elastic body is not necessarily formed of rubber and an elastic body with elasticity as described below is allowed to be used. As the elastic body is usable such a substance as the shape and size thereof are changeable when a force is applied thereto and an elastic pressure is produced so as to recover to the original shape when the force previously imposed is eliminated. In other words, such a substance as having a spring constant as defined by the aforementioned mathematical model 1 is allowed to be used. As the elastic body can be used such materials as rubber, a foam body, a porous material that is changeable in shape by an external pressure, and the like. Also, as the elastic body can be used such materials as making it hard for a vibration to be transferred or absorbing a vibration. Accordingly, the vibrations applied to the resonator from outside are prevented from varying, thereby allowing an angular velocity sensor with stabilized output characteristics to be realized. However, rubber is the most desirable as the elastic body and enhances the foregoing advantages greatly.

Industrial Applicability

With an angular velocity sensor of the present invention, vibrations imposed onto the resonator of the angular velocity sensor from outside are prevented from varying. Therefore, an angular velocity sensor with stable output characteristics is allowed to be realized.

What is claimed is:

1. An angular velocity sensor comprising:
   (a) a tuning fork type resonator including a first resonating member and a second resonating member each having a short side and a long side, and a connecting member connecting a first end of each of said first resonating member and sid second resonating member;

(b) a first base connected to said connecting member;

(c) a holding plate to hold said first base;

(d) a circuit board fixed onto said holding plate;

(e) an elastic body for holding an end part of at least one selected from said holding plate and circuit board, said elastic body having a first side for receiving said end part and a second side provided with at least one groove, said groove extending parallel to said end part received by said first side of said elastic body;

(f) a case housing said tuning fork type resonator, said first base, said holding plate, said circuit board and said elastic body and having an opening, and (g) a second base closing said opening of said case;

wherein said tuning fork type resonator is disposed in such a way as each of said long side of said first resonating member and second resonating member is directed in parallel to said first base and in perpendicular to said second base;

wherein said elastic body is located between an inner wall of said case and an end part of at least one of said holding plate and said circuit board, and at least one selected from said holding plate and circuit board is held by said case via an elastic pressure of said elastic body, and said case is closed by said second base.

2. The angular velocity sensor according to claim 1, wherein said tuning fork type resonator further comprises a driving electrode and a detecting electrode, said driving electrode and detecting electrode are disposed on at least one selected from said first resonating member and second resonating member.

3. The angular velocity sensor according to claim 2, wherein said driving electrode and detecting electrode have an output terminal, respectively, said first base has a plurality of terminal insertion holes, and said respective output terminals pass through said plurality of terminal insertion holes.

4. The angular velocity sensor according to claim 2, wherein said circuit board has an electronic device, a power supply electrode, a GND electrode and an output electrode, and said electronic device processes an output signal produced at said detecting electrode according to an angular velocity.

5. The angular velocity sensor according to claim 1, wherein said case housing has a bottom and a square-shaped cross section.

6. The angular velocity sensor according to claim 1, wherein said elastic body is a rubber molded body formed of rubber.

7. The angular velocity sensor according to claim 1, further comprising:

(h) a cover that is fixed onto said first base and covers said tuning fork type resonator.

8. The angular velocity sensor according to claim 1, further comprising:

(h) a cover that is fixed onto said first base and covers said tuning fork type resonator, said tuning fork type resonator further comprises a driving electrode and a detecting electrode, said driving electrode and detecting electrode are disposed on at least one selected from said first resonating member and second resonating member, said driving electrode and detecting electrode have an output terminal, respectively, said first base has a plurality of terminal insertion holes, said respective output terminals pass through said plurality of terminal insertion holes, said circuit board has an electronic device, a power supply electrode, a GND electrode and an output electrode, said electronic device processes an output signal produced at said detecting electrode according to an angular velocity, and said case has a bottom and a square-shaped cross section.

9. The angular velocity sensor according to claim 8, wherein said holding plate has at least two holding protrusions, and said two holding protrusions are fixed onto said circuit board, thereby allowing said circuit board to be held by said holding plate.

10. The angular velocity sensor according to claim 8, wherein a center of mass formed by combining said tuning fork type resonator, said first base, said cover, said holding plate and said circuit board coincides with a center of mass of said elastic body.

11. The angular velocity sensor according to claim 8, wherein said holding plate has at least two holding members, and said two holding members are swaged onto said first base, thereby allowing said first base to be affixed to said holding plate.

12. The angular velocity sensor according to claim 1, wherein said turning fork type resonator is sealed in a vacuum by said first base and said cover.

13. A manufacturing method of angular velocity sensors comprising the steps of:

(a) producing a tuning fork type resonator having a first resonating member and a second resonating member and a connecting member connecting a first end of each of said first resonating member and said second resonating member;

(b) producing a first base;

(c) producing a holding plate;

(d) producing a circuit board;

(e) producing an elastic body for holding an end part of at least one selected from said holding plate and circuit board, said elastic body having a first side for receiving said end part and a second side provided with at least one groove, said groove extending parallel to said end part received by said first side of said elastic body;

(f) producing a case;

(g) connecting said connecting member of said tuning fork type resonator to said first base;

(h) having said circuit board held onto said first base;

(i) fixing said first base onto said holding plate;

(j) putting together said tuning fork type resonator, said first base, said holding plate, said circuit board and said elastic body so as to have an end part of at least one selected from said holding plate and said circuit board held by said elastic body; and (k) having said assembly formed of said tuning fork type resonator, said first base, said holding plate, said circuit board and said elastic body housed in said case so as to have said holding plate and said circuit board located inside said case via said elastic body.

14. The manufacturing method of angular velocity sensors according to claim 13, further comprising the step of:
(i) producing a second base,
wherein said first resonating member and second resonating member has a short side and a long side,
said step (j) has the step of putting together said tuning fork type resonator, said first base, said holding plate, said circuit board, said second base and said elastic body assembled in such a way as said long side of said tuning fork type resonator directed in parallel to said first base, and
said step (k) has the steps of:
pressing into a case an assembly formed of said tuning fork type resonator, said first base, said holding plate, said circuit board, said second base and said elastic body so as to have said long side direction of said tuning fork type resonator arranged perpendicular to said second base; and
closing an opening of said case with said second base in such a way as having at least one selected from said holding plate and said circuit board held onto said case by an elastic pressure of said elastic body.

15. The manufacturing method of angular velocity sensors according to claim 14,
wherein said step of producing said tuning fork type resonator has the step of producing a resonator comprising a driving electrode and a detecting electrode,
said driving electrode and detecting electrode are disposed on at least one selected from said first resonating member and second resonating member.

16. The manufacturing method of angular velocity sensors according to claim 13, further comprising the step of:
(m) producing a cover;
wherein said step (j) includes a step of fixing said cover onto said first base so as to cover said tuning fork type resonator.

17. The manufacturing method of angular velocity sensors according to claim 13,
wherein said driving electrode and detecting electrode have an output terminal, respectively,
said first base has a plurality of terminal insertion holes, and
said step (i) includes the step of passing said respective output terminals through said plurality of terminal insertion holes.

18. The manufacturing method of angular velocity sensors according to claim 13,
wherein said circuit board includes an electronic device, a power supply electrode, a GND electrode and an output electrode, and
said electronic device processes an output signal produced at said detecting electrode according to an angular velocity.

19. The manufacturing method of angular velocity sensors according to claim 13,
wherein said step of producing said elastic body includes the step of producing a molded rubber piece by applying a molding process to a rubber material.

* * * * *